(12) United States Patent
Davis et al.

(10) Patent No.: US 8,812,253 B2
(45) Date of Patent: Aug. 19, 2014

(54) FLUID FLOW MEASUREMENT WITH PHASE-BASED DIAGNOSTICS

(75) Inventors: Dale Scott Davis, Prior Lake, MN (US); David Eugene Wiklund, Eden Prairie, MN (US)

(73) Assignee: Rosemount Inc., Bloomington, MN (US)

( * ) Notice: Subject to any disclaimer, the term of this patent is extended or adjusted under 35 U.S.C. 154(b) by 664 days.

(21) Appl. No.: 12/802,513

(22) Filed: Jun. 8, 2010

(65) Prior Publication Data

US 2011/0301867 A1    Dec. 8, 2011

(51) Int. Cl.
 *G01F 1/34*  (2006.01)
 *G01F 1/37*  (2006.01)
 *G01F 1/88*  (2006.01)
 *G01F 23/00* (2006.01)

(52) U.S. Cl.
 CPC ............. *G01F 1/88* (2013.01); *G01F 23/0007* (2013.01)
 USPC ........ 702/45; 702/100; 73/861.04; 73/861.52

(58) Field of Classification Search
 USPC .................................................... 702/30, 47
 See application file for complete search history.

(56) References Cited

U.S. PATENT DOCUMENTS

| | | | |
|---|---|---|---|
| 6,299,735 B1 * | 10/2001 | Lumbreras ..................... 203/10 |
| 6,572,807 B1 * | 6/2003 | Fong ............................. 264/237 |
| 6,723,463 B2 * | 4/2004 | Sugita et al. .................. 429/456 |
| 7,928,162 B2 * | 4/2011 | Kiss et al. ........................ 525/53 |
| 8,065,923 B2 * | 11/2011 | Duhanyan et al. ......... 73/861.42 |
| 2004/0194539 A1 * | 10/2004 | Gysling ........................ 73/61.45 |
| 2007/0042178 A1 * | 2/2007 | Sachweh et al. .............. 428/336 |

OTHER PUBLICATIONS

"Model IMV30 I/A Series® Multivariable Transmitters for P, DP, and T Measurement with HART or FoxCom™ Communication Protocol", Field Devices—Pressure, Product Specifications, Copyright 2000-2009 Invensys Systems, Inc., 24 pp.*
D.S.Agafontsev et al., "Stability and collapse of solitons near transition from supercritical to subcritical bifurcation in hydrodynamical systems", P.N.Lebedev Physical Institute of RAS, Centre de Mathématiques et de Leurs Applications, ENS Cachan, France, Solitons, Collapses and Turbulence, Chernogolovka 2009, 12 pp.*
I/A Series® Intelligent Electronic Multivariable Transmitters IMV25-D and IMV30-D with Digital FoxCom™ or 4 to 20 mA Output Signals, Instructions, MI 020-432, 2000-2010 Invensys Systems, Inc., May 2010, 76 pp.*

* cited by examiner

*Primary Examiner* — Michael Nghiem
*Assistant Examiner* — Alexander Satanovsky
(74) *Attorney, Agent, or Firm* — Kinney & Lange, P.A.

(57) ABSTRACT

A system comprises a differential pressure sensor, a process pressure sensor, a temperature sensor and a microprocessor. The differential pressure sensor is positioned to sense differential pressure along a fluid flow, where fluid properties of the fluid flow have first and second phases separated along a transition curve. The process pressure sensor is positioned to sense a pressure of the fluid flow, and the temperature sensor is positioned to sense a temperature of the fluid flow. The microprocessor is coupled to the temperature sensor and the pressure sensor to determine a flow rate, and the microprocessor generates a diagnostic based on the process pressure and the temperature as compared to the transition curve.

28 Claims, 5 Drawing Sheets

FLUID FLOW MEASUREMENT WITH PHASE-BASED DIAGNOSTICS

BACKGROUND

Differential pressure and flow measurements have important applications in a wide range of fluid processes, including food and beverage production, water treatment, pharmaceuticals, hydrocarbon fuel extraction, petrochemical processing, manufacturing, transportation and energy production. In each of these applications, process measurement and control systems utilize a range of stand-alone pressure sensors, transmitters and field devices to monitor and control process pressure and related parameters, including mass and volumetric flow rates.

In many fluid processes, flow is not limited to a single component or phase. Examples include pulverized coal, coal slurry, hydraulic mining, oil/water/gas extraction and $CO_2$-based flows for supercritical extraction or carbon sequestration. Where pressure-based measurements are used to determine the volumetric or mass flow rate, moreover, these measurements also depend upon fluid density. The density varies with process temperature and pressure, as well as the phase and composition of each individual flow component, and each of these factors plays a role in overall accuracy.

SUMMARY

This invention concerns a system for measuring fluid flow, and for generating phase-based diagnostics related to fluid properties of the flow. The system comprises a differential pressure sensor, a process pressure sensor, a temperature sensor and a microprocessor with a phase-based software diagnostic module.

The differential pressure sensor is positioned to sense differential pressure along a process fluid flow, where fluid properties of the flow have a first (e.g., liquid) phase and a second (e.g., vapor) phase separated along a saturation line or other transition curve. The process pressure and temperature sensors are positioned to sense process pressure and process temperature, respectively. The microprocessor is coupled to the differential pressure sensor, the process pressure sensor and the temperature sensor in order to determine the flow rate. The diagnostic module generates a diagnostic based on the process pressure and the temperature as compared to the transition curve.

DETAILED DESCRIPTION

Figure 1:
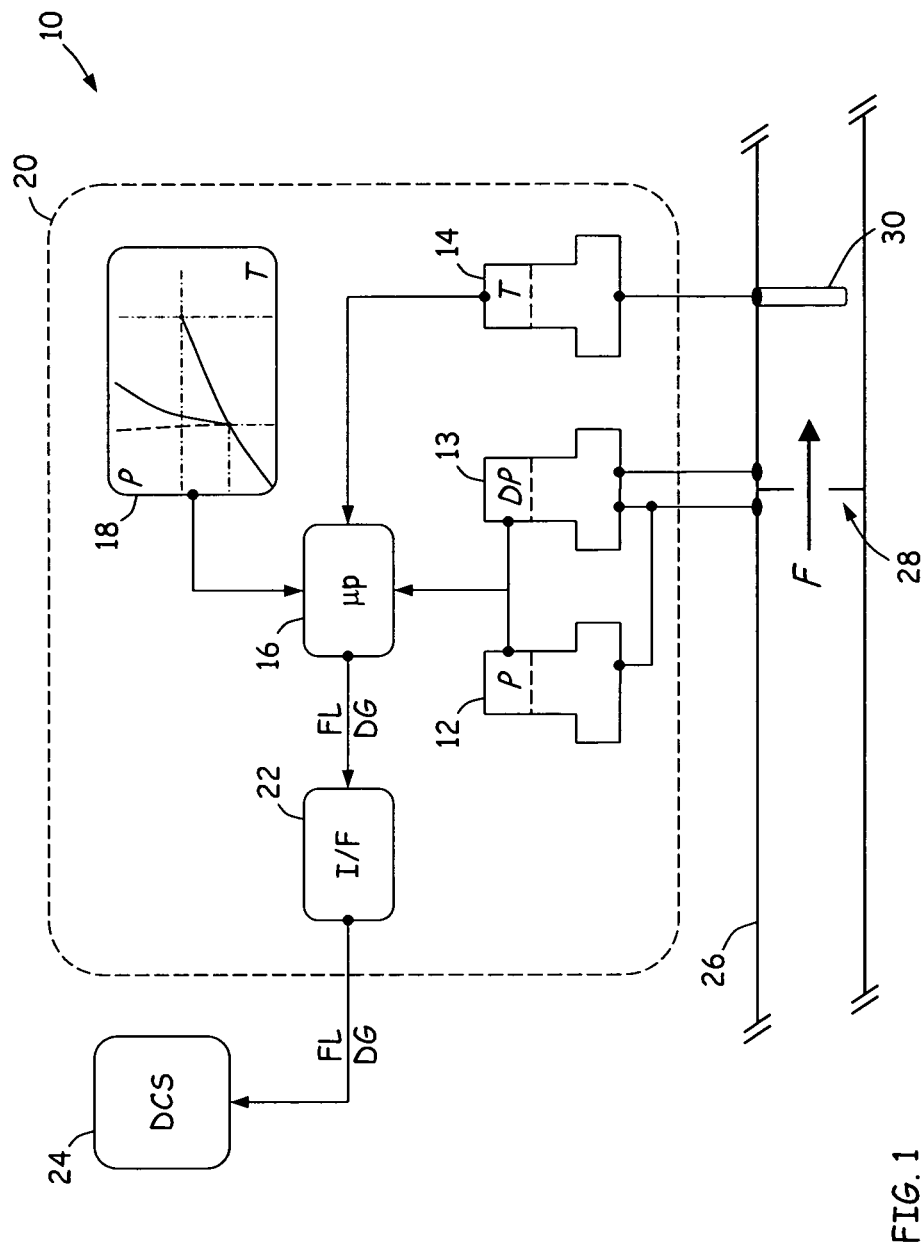
FIG. 1 is a schematic diagram of a flow rate measurement system with phase-based diagnostics.

FIG. 1 is a schematic diagram of mass flow measurement system 10 with phase-based diagnostics. System 10 comprises pressure sensor 12 for sensing process pressure P, differential pressure sensor 13 for sensing differential pressure DP, temperature sensor 14 for sensing temperature T, and microprocessor (μp) 16 with software module 18 for generating flow signal FL and fluid phase diagnostic DG.

Flow signal FL describes the process flow rate as a function of differential pressure DP. Typically, the flow rate also depends upon process pressure P and temperature T, which enter through the fluid density (ρ) and viscosity (μ), and via geometrical considerations and the expansibility factor, including thermal expansion and pressure and temperature contributions to the isentropic exponent.

Diagnostic module 18 generates diagnostic signal DG as a function of process pressure P and temperature T, as compared to a saturation line or other phase function describing the process fluid. Diagnostic signal DG is related to the fluid properties of process flow F, and in particular to phase transitions, which affect flow measurement accuracy for at least the reason that they affect fluid density ρ. In some embodiments, diagnostic signal DG also indicates a phase transition or mixture of phases, or calibration errors or hardware faults in process pressure sensor 12, DP sensor 13 or temperature sensor 14.

Depending on embodiment, sensors 12, 13 and 14 are either provided in the form of independent (standalone) modules, or they are incorporated into one or more field devices or transmitters 20. As shown in FIG. 1, for example, transmitter 20 incorporates elements of process pressure sensor 12, differential pressure (DP) sensor 13 and temperature sensor 14, along with memory and data processing components for microprocessor 16, diagnostic module 18 and interface (I/F) 22.

Process pressure sensor 12, DP sensor 13 and temperature sensor 14 are positioned in thermodynamic contact with process flow F in flow pipe (or conduit) 26, in order to generate signals representing process pressure P, differential pressure DP and process temperature T, respectively. In the particular embodiment of FIG. 1, for example, DP sensor 13 is connected across a flow restriction such as orifice plate 28, in order to generate a differential pressure (DP) signal related to the flow rate. Process pressure (P) sensor 12 is connected to the upstream line of DP sensor 13 in order to generate a signal related to process pressure, for example a gauge pressure (GP) or an absolute pressure (AP). Alternatively, process pressure sensor 12 is coupled to the downstream line of DP sensor 13, or sensor 12 utilizes an independent process fluid connection for sensing process pressure P.

Temperature (T) sensor 14 comprises a temperature-sensitive element positioned in thermal contact with process flow F, for example a thermocouple or resistance-temperature device (RTD) located in thermowell 30, mounted in flow pipe 26 downstream of orifice plate 28. Downstream thermowell configurations reduce wake effects on DP sensor 13 at orifice plate 28, but upstream mounts are also possible. Alternatively, temperature sensor 14 utilizes an external thermal coupling to flow pipe 26, or an internal or embedded primary element configuration. In some of these embodiments, sensors 12, 13 and 14 utilize a direct flange or pipe-mounted configuration, or an indirect coupling such as impulse tubing, or a combination thereof.

In operation of system 10, microprocessor 16 utilizes Bernouli's Principle or an associated pressure/flow relationship to determine the flow rate based on differential pressure DP and fluid density ρ, and other parameters such as viscosity μ. Fluid density ρ, in turn, depends on process pressure P and temperature T, where the pressure dependence is relatively less for substantially incompressible fluids such as water and relatively greater for compressible fluids including steam, natural gas and other gases.

Microprocessor 16 incorporates diagnostic software module 18 to generate diagnostic signal DG based on pressure P and temperature T, as compared to phase data describing the phase of the process fluid, and its fluid properties. Alternatively, diagnostic module 18 is provided in standalone form, with independent memory and processing components.

Interface 22 provides for power input and communications between transmitter 20 and distributed control system (DCS) 24, or with a local or remote operator. Depending on embodiment, these communications include analog signaling, analog control, and digital signaling and control. In the particular embodiment of FIG. 1, for instance, interface 22 transmits analog flow signal FL and digital diagnostic signal DG from microprocessor 16 to DCS module 24, for example as a digital diagnostic signal superposed on the analog flow signal. Alternatively, both the flow signal and the diagnostic signal are digital, or both are analog.

Flow signal FL characterizes the volumetric flow rate or mass flow rate of process flow F, or the flow velocity, or a combination thereof. Diagnostic signal DG characterizes the phase of process flow F, and, in particular, indicates the potential for phase transitions in the process fluid, as related to flow rate accuracy. Depending on embodiment, diagnostic signal DG also indicates potential sensor errors or hardware failures, for example a miscalibration or sensor fault in process pressure sensor 12, DP sensor 13 or temperature sensor 14.

Phase transitions are relevant to the operation of system 10 and transmitter 20 because pressure-based flow measurements rely on fluid density ρ to determine the flow rate, and fluid density ρ depends not only on process pressure P and temperature T but also on the phase of the process fluid. While the rated flowmeter accuracy typically relies on a single-phase assumption for the process fluid, moreover (that is, all liquid, all vapor or all gas), this is not always the case. Water-based fluid processes are susceptible to freezing and vaporization, while steam and gas flows often involve mixed liquid and vapor phases. Natural gas and $CO_2$ applications also implicate multi-phase flow, not only in the liquid and vapor states but also in the supercritical phase.

Phase considerations impact not only the mass flow rate, which depends directly on fluid density ρ, but also the volumetric flow rate, which depends indirectly on density through Bernoulli's equation and associated kinetic and thermodynamic relations. Accurate flow measurements thus depend not only on how process variables P and T relate to fluid density ρ, given a particular fluid phase, but also on how these variables relate to the phase itself, as determined by using diagnostic module 18 to compare process pressure P and temperature T to a saturation line or other phase-related data.

Figure 2A:
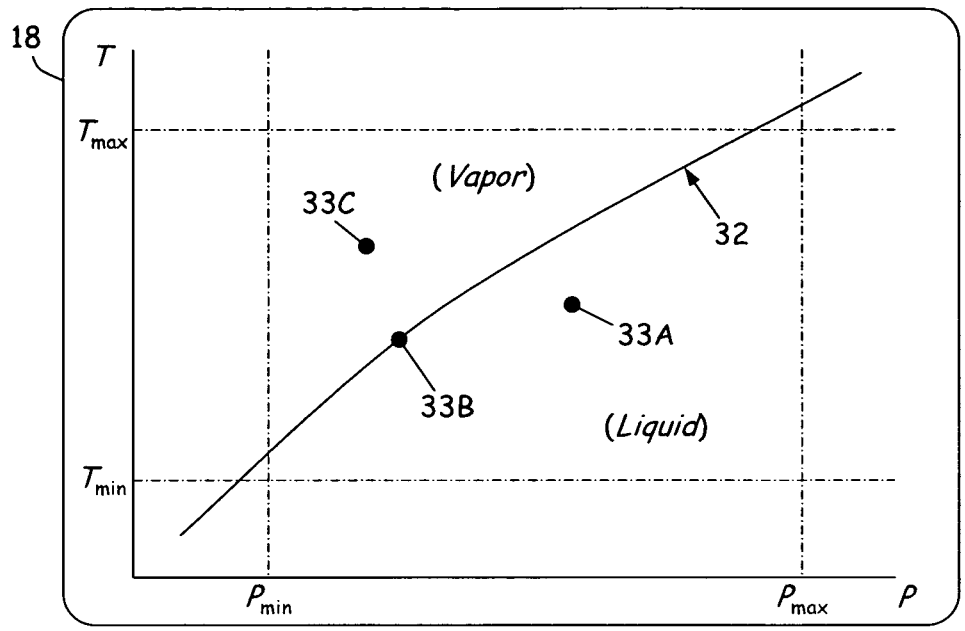
FIG. 2A is schematic illustration of a diagnostic module describing the saturation line for a process fluid in terms of process temperature T as a function of process pressure P.

FIG. 2A is a schematic illustration of diagnostic module 18, in an embodiment describing saturation line 32 for a particular process fluid. Saturation line 32 defines the saturation point (or condensation point) in terms of process temperature T (on the vertical axis), as function of process pressure P (on the horizontal).

Saturation line 32 separates the phase plot into distinct liquid and vapor phase states, with the liquid phase at generally lower temperature T and higher pressure P, and the vapor phase at generally higher temperature T and lower pressure P. Transitions occur along saturation line 32, where process temperature T is approximately equal to the condensation temperature (or the boiling temperature), as defined for particular process pressures P.

As shown in FIG. 2A, the process fluid normally exists in a liquid phase when process temperature T is less than the value of saturation line 32, as defined at pressure P (e.g., point 33A), and in a vapor phase when temperature T is greater than the value of saturation line 32 (e.g., point 33C). When process conditions fall on the saturation line, however, phase transitions and liquid/vapor mixing are possible. This occurs, e.g., at point 33B, with temperature T approximately equal to the value of saturation line 32 as defined at pressure P, and with pressure P approximately equal to the value of saturation line 32 as defined at temperature T.

A number of different diagnostics can be generated by comparing process pressure P and process temperature T to saturation line 32, or a related phase transition function. When process pressure P and process temperature T fall on saturation line 32, for example, as described above for point 33B, the diagnostic indicates a possible liquid/vapor phase transition or multiphase flow condition. In water and other liquid flows this corresponds to evaporation or boiling, and in steam and gas flows this corresponds to condensation.

In general, the latent heat of vaporization (or other phase transition) tends to stabilize the process variables along the transition curve. Thus the relative phase content (or "quality") is not necessarily defined as a function of process pressure P and temperature T, alone, without an independent measurement of fluid density ρ.

When process temperature T is substantially less than (below) the value of saturation line 32 (e.g., point 33A), the diagnostic indicates liquid phase flow, or flow with a substantial liquid component. While this would be a nominal condition for water and other liquid flows, it indicates potential or actual condensation in gas, steam and other vapor-phase flows, which can affect flow rate accuracy. Condensation and related wet-gas effects are an issue even at relatively low levels of condensation in otherwise high-quality flow (e.g., $90\% \leq Q < 100\%$), and at relatively high levels of condensation in lower-quality flow (e.g., $Q < 90\%$). Condensation is also an inhomogeneous effect, tending to accumulate along the sides of a vertical pipe run and on the bottom of a horizontal run, and this leads to additional effects in the flow rate measurement.

If process temperature T is substantially greater than (above) the value of saturation line 32 (e.g., point 33C), the diagnostic indicates vapor phase flow, or flow with a substantial vapor component. For steam and gas applications this would be a nominal condition, but for water and other liquid-phase flows the diagnostic indicates potential or actual phase transitions such as boiling and vaporization. Phase-based diagnostics are also applicable to other multi-phase conditions in natural gas and other hydrocarbon flows, and in carbon dioxide flows.

Phase-based diagnostics distinguish from single-variable and range-based techniques, for example diagnostics based on operational ranges of $T_{min}$-$T_{max}$, for temperature T and $P_{min}$-$P_{max}$, for process pressure P, as shown in FIG. 2A. In particular, phased-based diagnostics relate to the physical state of the process fluid, as described by a particular functional relationship between process pressure P and temperature T, and thus provide more information than is available from the phase variables alone. This approach also defines phase relationships in objective terms; that is, based on the value of the phase variables as compared to the transition function, rather than the subjective (e.g., up-down or left-right) orientation of the phase plot itself.

More specifically, temperatures T fall on or above saturation line 32 when temperature T is approximately equal to (point 33B) or greater than (point 33C) the value of saturation line 32, respectively, as defined at a particular pressure P. Conversely, temperatures T fall below saturation line 32 when pressure P is less than the value of saturation line 32; that is, less than the saturation point, as defined for a particular process pressure P (e.g., point 33B). Because these definitions depend upon the objective values of the process variables, rather than subjective orientation of the phase plot, they are equally applicable to phase transitions represented along a horizontal temperature axis (see, e.g., FIG. 2B, as described below). Similarly, process pressures P fall on saturation line 32 when process pressure P is approximately equal to the value of saturation line 32, as defined at a particular temperature T (point 33B), and process pressures P fall above or below saturation line 32, respectively, when pressure P is greater than (point 33A) or less than (point 33C) that value.

Tolerances for process variables P and T depend upon sensor calibration, transmitter configuration and operating conditions, and may be defined in either absolute or relative terms. For temperatures T, typical tolerances are ±1-2 degrees ° F. or ±1-2° C., depending on application and user preference. Alternatively, a relative temperature tolerance is used, for example 0.5% or 1.0%. Pressure tolerances are typically somewhat less, for example 0.04% or 0.2%, but in some systems the pressure and temperature tolerances are comparable.

Based on the tolerance, process conditions are thus said to fall on a particular transition curve when temperature T is within ±1-2 degrees (° F. or ° C.) of the value of the curve, as defined for a particular process pressure P, or within 0.04%, 0.2%, 0.5% or 1.0% of that value. Similarly, process pressures P fall on the transition curve when pressure P is within, for example, 0.04%, 0.2%, 0.5% or 1.0% of the value of the curve, as defined for a particular process temperature T.

Depending on operating conditions, process variables that fall substantially above or below (that is, outside the nominal tolerance of) a particular transition curve may also indicate a sensor error or other hardware failure, rather than a phase transition. This is relevant, for example, to RTDs, thermistors, thermocouples and thermowells, particularly when subject abrasive or corrosive flows, rapid or repeated temperature cycling, and flow-induced vibrations. Other sensor errors are indicated when particular combinations of process variables P and T result in non-physical or out-of-specification values for derived quantities, for example fluid density $\rho$, or the flow rate.

Solid-phase transitions also affect flow measurements by introducing suspended components or flow obstructions, and supercritical transitions are relevant to natural gas, organic fluid and $CO_2$-based processes. In these embodiments, additional phase data are provided in order to generate additional diagnostics based on more generalized phase transitions, and as applied to both single- and multiple-component (or multiple-fraction) process fluid flow.

Figure 2B:
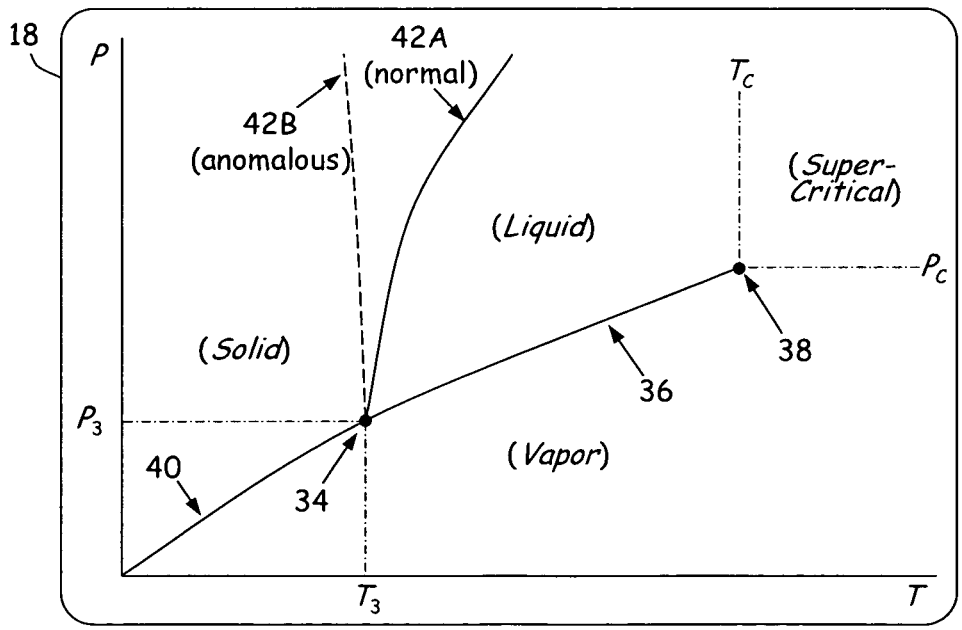
FIG. 2B is a schematic illustration of a diagnostic module describing the phase diagram for fluid properties of a process fluid in terms of process pressure P as a function of process temperature T.

FIG. 2B is schematic illustration of diagnostic module 18, in an embodiment describing a generalized phase diagram for a particular process fluid component. In this representation, the phase diagram defines the fluid properties of solid, liquid, and vapor states (phases) based on process pressure P (on the vertical axis), as a function of process temperature T (horizontal axis).

As shown in FIG. 2B, the solid, liquid and vapor phases coexist at triple point 34, which is defined at triple-point pressure $P_3$ and triple-point temperature $T_3$. The two fluid phases (liquid and vapor states) are separated along vaporization curve 36, which is essentially the functional inverse of saturation line 32 in FIG. 2A, above. Vaporization curve 36 extends from triple point 34 to critical point 38 at critical pressure $P_C$ and critical temperature $T_C$, above which point the fluid transitions to a supercritical or superfluid state.

The solid and vapor phases are separated along sublimation curve 40, extending downward from triple point 34 in FIG. 2B, and the solid and liquid phases are separated along melting curves 42A and 42B, extending upward from triple point 34. Normal melting curve 42A (solid line) is shown with a positive slope, as defined in terms of process pressure P versus temperature T, and anomalous melting curve 42B (dashed line) has a negative slope, as characteristic of water and water-based solutions or suspensions.

Vaporization curve 36 defines both the vaporization point and the condensation point for the process fluid, and liquid/vapor phase transitions along curve 36 are complementary to the vapor/liquid transitions defined along saturation line 32 of FIG. 2A, above. In terms of process pressure P, transitions from the vapor phase to the liquid phase are indicated at pressures P equal to or greater than (on or above) the value of vaporization curve 36, as defined for a particular temperature T, and transitions from the liquid phase to the vapor phase are indicated at pressures P equal to or less than (on or below) the value of vaporization curve 36. This corresponds to condensation or droplet formation in a gas or other vapor-phase process fluid, and vaporization, boiling or foaming in organic liquids, water and other liquid-phase process fluids.

Phase transitions can also be defined in terms of temperature T, as described above for FIG. 2A. For liquid-phase process fluids, that is, vaporization curve 36 also defines the vaporization temperature in terms of process pressure P, with vaporization (or boiling) at temperatures T on or above curve 36. Vaporization curve 36 also defines the condensation temperature for vapor-phase fluids, again as a function of process pressure P, with condensation and droplet formation at temperatures T on or below curve 36.

Solid/vapor phase transitions are defined along sublimation curve 40, which defines the sublimation point or sublimation temperature function extending downward from triple point 34. Sublimation from the solid phase to the vapor phase occurs at temperatures T equal to or greater than (on or above) the value of sublimation curve 40, as defined for process pressures $P \leq P_3$, and at process pressures P equal to or less than (on or below) the value of sublimation curve 40, as defined for temperatures $T < T_3$. Conversely, solid phase deposition (frost) occurs at temperatures T on or below sublimation curve 40, as defined at process pressures $P \leq P_3$, and at process pressures P on or above sublimation curve 40, as defined at temperatures $T \leq T_3$.

Solid/liquid phase transitions are defined along melting curves 42A and 42B, extending upward from triple point 34, where curves 42A and 42B define the melting and freezing points for normal and anomalous fluids, respectively. In particular, melting occurs at temperatures T equal to or greater than (at or above) the melting point, as defined at process pressures $P > P_3$ along melting curves 42A and 42B, and freezing and solidification occur at temperatures T equal to or less than (at or below) the melting point (or freezing point).

In terms of process pressure P, the solid/liquid phase transition depends upon whether the melting curve is normal (solid line 42A) or anomalous (dashed line 42B). For normal fluids, melting occurs at pressures P approximately equal to or less than (on or below) normal melting curve 42A, as defined for process temperatures $T > T_3$, and solidification (freezing) occurs at pressures P approximately equal to or greater than (on or above) normal melting curve 42A. For anomalous fluids, however, the solid/liquid transition is defined for temperatures $T<T_3$ and melting occurs at pressures P on or above anomalous curve 42B, with freezing at pressures P on or below curve 42B.

Superfluid phase transitions occur at pressures $P>P_C$ and temperatures $T>T_C$ above critical point 38. More specifically, gaseous fluids tend to behave as superheated vapors at supercritical temperatures $T>T_C$, and superheated vapors become supercritical fluids at pressures $P>P_C$. Liquids tend to become more compressible at supercritical pressures $P>P_C$, and transition to the supercritical state at temperatures $T>T_C$.

In contrast to the solid, liquid and vapor states, however, supercritical phase transitions are typically continuous or second-order in nature, rather than discrete. In particular, to the extent that little or no latent heat is involved, there is less tendency to stabilize pressure P and temperature T along well-defined supercritical transition lines or curves. Nonetheless supercritical fluid properties including the density vary substantially with pressure P and temperature T, and phase-based diagnostics based on critical point 38 are relevant to a number of fluid processes including supercritical extraction, organic superfluids, $CO_2$-based hydrocarbon fuel extraction and carbon sequestration.

As described above for FIG. 2A, relationships between process variables P and T and transition curves 36, 40 and 42 (or triple point 34 and critical point 38) are typically defined in terms of a particular tolerance. Specifically, process pressures P are said to fall on (or proximate) a transition curve, or a point on a curve, when pressure. P is approximately equal to the value of the curve or point, as defined at temperature T, or when pressure P is within a particular tolerance of the curve or point, for example 0.04%, 0.2%, 0.5% or 1%. Conversely, process pressures P fall above or below a particular curve or point when the value of pressure P is greater than or less than the value of the curve or point, respectively, as defined at temperature T, or when the difference between pressure P and the value of the curve or point equals or exceeds the given tolerance.

Similarly, process temperatures T are said to fall on or proximate a particular transition curve or point when temperature T is approximately equal to the value of the curve or point, as defined at a particular process pressure P, or when temperature T is within a particular tolerance of the curve or point, for example within ±1-2° F. (or ° C.), or within 0.04%, 0.2%, 0.5% or 1%. Temperatures T fall above or below the curve or point when they are greater than or less than its value, as defined at a particular process pressure P, or when the value of temperature T exceeds or falls below the value of the curve or point by more than the tolerance.

As noted above, the relative vapor content (or quality) is not single-valued along the transition curve, but varies from zero to one. In devices that measure only process pressure P or process temperature T, moreover, particular phase conditions are typically assumed, for example that the flow is saturated and at 100% quality. Diagnostics based on measurements of both process pressure P and process temperature T, in contrast, provide a definitive test between single-phase and multi-phase flow conditions. In particular, saturation can be quantitatively tested by comparing process temperature T to the actual saturation point for the process fluid, as defined at process pressure P, rather than simply assuming a saturation pressure based on process temperature T alone, or assuming a saturation temperature based on process pressure P alone.

Superheated and supercooled liquid states are also present in a number of processing applications. Superheated liquids are liquid-phase fluids having temperature T above the boiling point, as defined for particular pressures P along vaporization curve 36, or above the saturation point, as defined along saturation line 32 of FIG. 2A. This distinguishes, for example, between superheated water and superheated steam, where the latter is above the saturation point but exists in a vapor phase, rather than a liquid phase.

Supercooled liquids, conversely, are liquids that are cooled to temperatures T below the freezing point, as defined along melting curve 42A or 42B. Both superheated and supercooled liquids are relevant to flow measurement and phase-based diagnostic methods because they can indicate unexpected or undesirable phase conditions. The supercooled and superheated liquid states are also unstable, and subject to rapid phase transformation when the process flow becomes turbulent or nucleation sites are introduced.

As with diagnostics based on saturation line 32 of FIG. 2A, above, anomalous values of the pressure and temperature may also indicate hardware or calibration problems, as well as actual phase transitions. In particular, sensor errors are indicated by pressure and temperature values significantly above or below a particular phase transition, as defined for the nominal liquid or vapor calibration state for the flowmeter, and when phase variables P and T (or differential pressure DP) generate non-physical or out-of-specification results for derived quantities such as fluid density and volumetric or mass flow rate.

Figure 3:
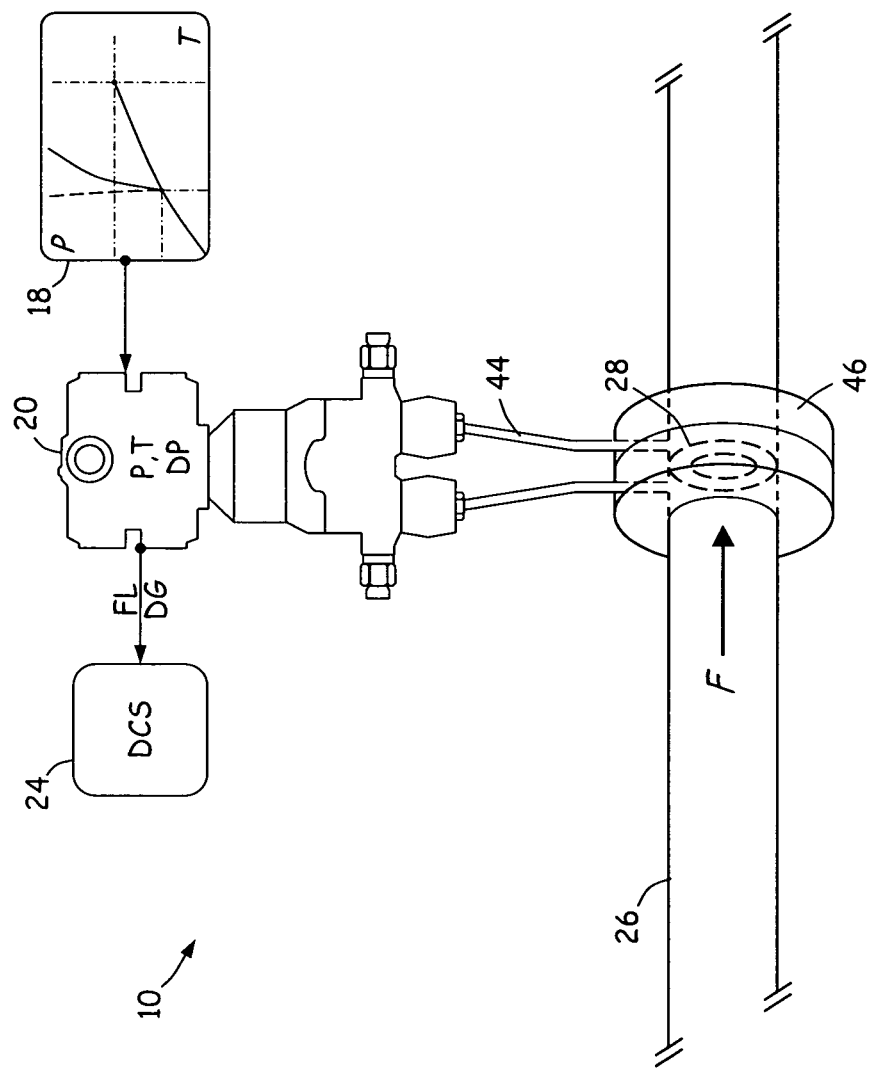
FIG. 3 is a schematic diagram of a transmitter-based system for generating flow measurements with phase-based diagnostics.

FIG. 3 is a schematic diagram of system 10 in a transmitter-based embodiment, utilizing impulse tubing 44 to couple transmitter 20 to process flow F inside flow pipe 26. In this particular embodiment, transmitter 20 measures the rate of process flow F as a function of the differential pressure generated across orifice plate 28, where orifice plate 28 is mounted inside flow pipe 26 at flange 46. Alternatively, transmitter 20 is coupled across a Venturi tube or other device for generating a differential pressure drop based on the flow rate, and the pressure and temperature couplings are either indirect or direct, as described above.

Transmitter 20 provides flow rate output FL in either volumetric or mass flow format, and utilizes diagnostic module 18 to generate diagnostic DG. In the particular embodiment of FIG. 3, diagnostic module 18 is provided as an external standalone component, but in other embodiments diagnostic module 18 is incorporated within transmitter 20, as described immediately below with respect to FIG. 4.

Figure 4:
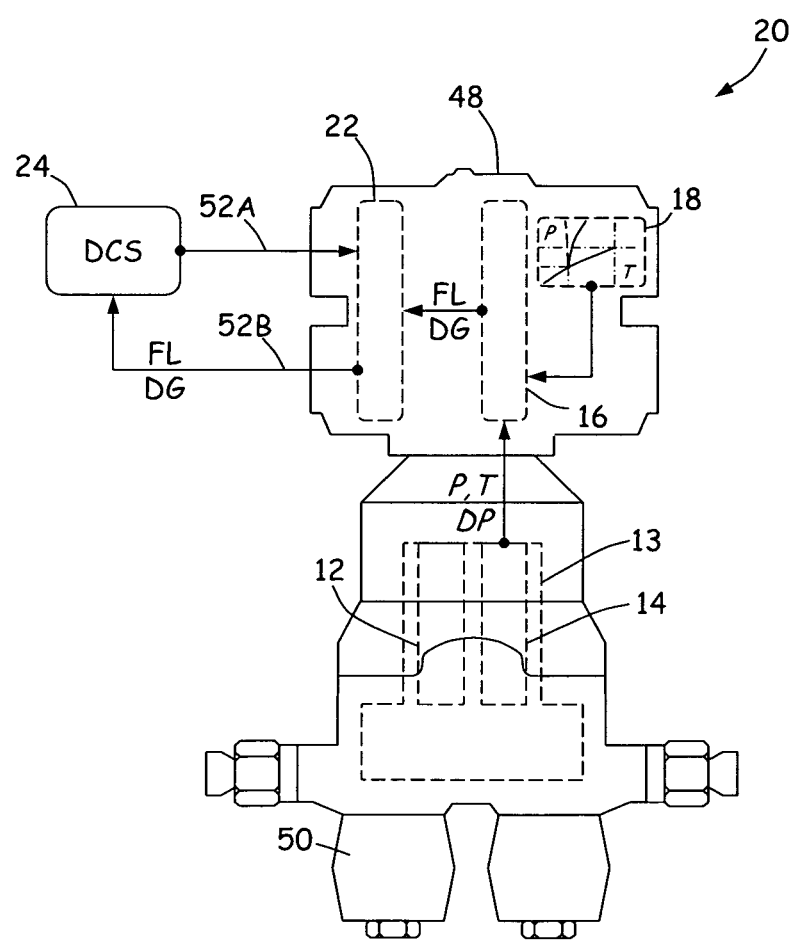
FIG. 4 is a schematic diagram of a multivariable transmitter for generating flow measurements with phase-based diagnostics.

FIG. 4 is a schematic diagram of transmitter 20 for generating flow measurements FL and fluid phase diagnostics DG. In this particular embodiment, transmitter 20 comprises a multivariable transmitter such as a 3051SMV, as available from Rosemount Inc. of Chanhassen, Minn., an Emerson Process Management company. Alternatively, discrete components are used, as described above with respect to system 10 of FIG. 1 and transmitter 20 of FIG. 3, or a combination of single-variable and multiple-variable transmitters are used.

As shown in FIG. 4, transmitter 20 comprises process pressure sensor 12, DP sensor 13 and temperature sensor 14, each having components incorporated within a single (unitary) transmitter housing 48. In this multivariable transmitter embodiment, housing 48 also encloses microprocessor 16, diagnostic module 18 and interface 22, and provides fluid and pressure seals to protect from moisture, electric shock, explosive or corrosive agents, and other operational hazards.

Sensors 12, 13 and 14 are coupled to a process flow to provide thermodynamic contact with a process fluid, for example using flange adaptor 50. Depending on embodiment, the process pressure, differential pressure and temperature couplings include impulse tubing, thermowell-type and direct flange-mounted configurations, as described above with respect to FIGS. 1 and 3, or combinations thereof.

Microprocessor 16 is electrically coupled to each of sensors 12, 13 and 14 in order to determine volumetric or mass flow rate output FL based on process pressure P, differential pressure DP and process temperature T. Microprocessor 16 also utilizes diagnostic module 18 to generate phase diagnostic DG as a function of pressure P and temperature T, as compared to phase data describing the process fluid. In particular, the phase data define saturation lines, vaporization curves, condensation curves, melting curves, freezing curves, sublimation curves, triple points or critical points for one or more process fluid components, as described above with respect to FIGS. 2A and 2B.

In the particular embodiment of FIG. 4, diagnostic module 18 is incorporated into microprocessor 16. Alternatively diagnostic module 18 is provided as a standalone module, for example as shown in FIGS. 1 and 3, above.

Transmitter 20 is coupled to DCS module 24 or a user/operator via interface 22, utilizing two-wire loop connections 52A and 52B or a data/power bus, wireless interface or other process communications hardware. Transmitter 20 supports a variety of low-power analog, hybrid analog/digital and digital measurement and control protocols in wireless and hard-wired configurations, including HART®, Fieldbus Foundation™, PROFI® BUS and PROFI® NET, utilizing a range of corresponding hard-wired and wireless device configurations. In some embodiments, transmitter 20 also provides a local interface for direct user/operator communications, for example using an LCD screen, a touch screen or other display device.

In the two-wire configuration of FIG. 4, transmitter 20 and DCS 24 utilize a low-power analog or analog/digital (hybrid) signal protocol having a combined signal and power current of less than about 40 mA, or about 4-20 mA. In some of these embodiments, transmitter 20 operates on a maximum (DC) voltage of about 12 V or about 24 V, with a total power consumption of about 48-240 milliwatt (mW), or less than about 500 mW. Power consumption is a critical design parameter because of the need for extended-area process control systems utilizing multiple transmitters in remote locations and hazardous or explosive environments, where standard (e.g., 120 V AC) power connections are costly or impractical. Power consumption is also critical due to the difficulty of incorporating complex multi-variable flow rate and phase diagnostic calculations, as described herein, in a low-power transmitter package, where computational power is limited.

Figure 5:
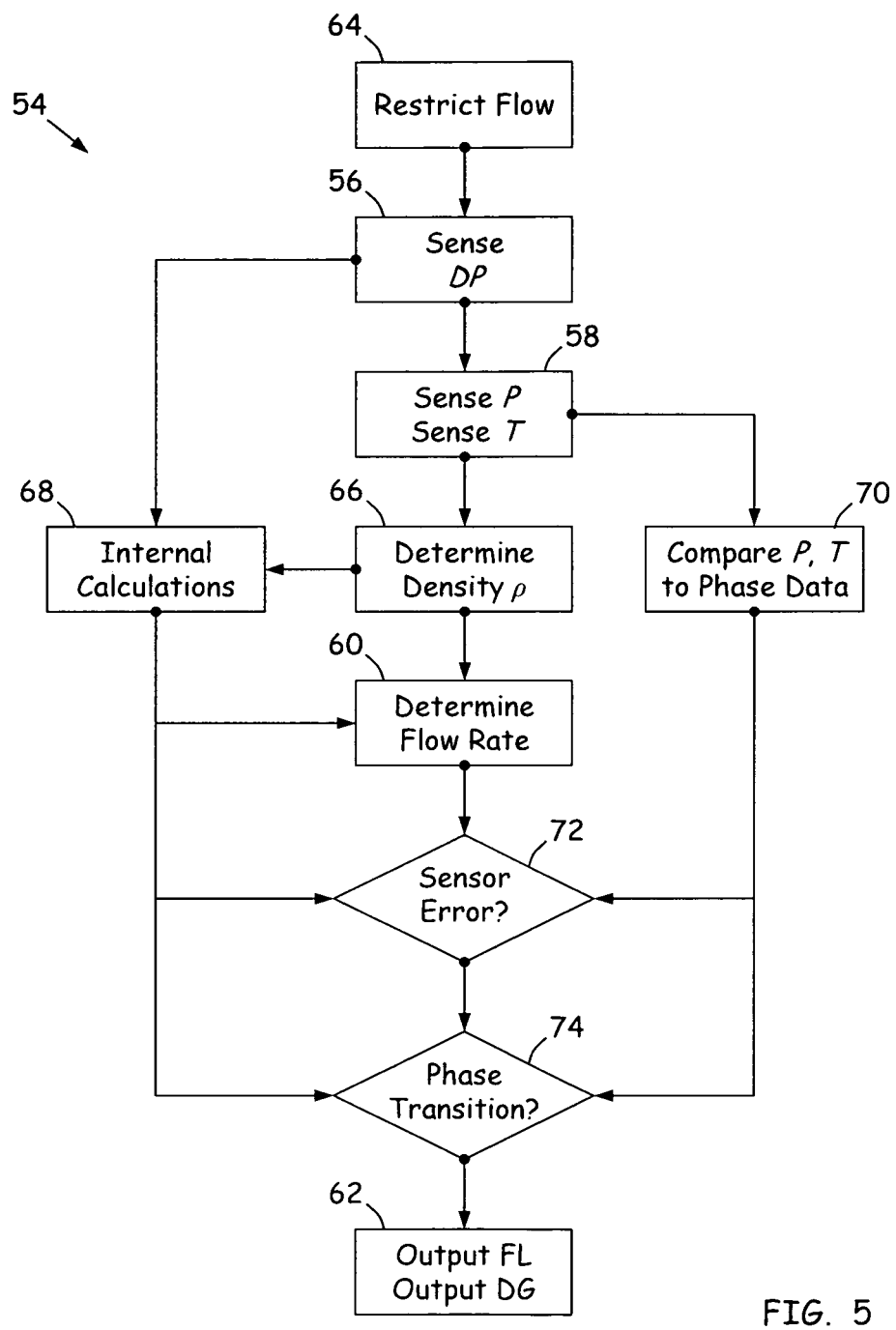
FIG. 5 is a flow chart illustrating a method for generating flow measurements and phase-based diagnostics.

FIG. 5 is a flow chart illustrating method 54 for measuring process flow rates with fluid phase diagnostics. Method 54 comprises sensing differential pressure DP along a process fluid flow (step 56), sensing process pressure P and temperature T for the process fluid (step 58), determining a process flow rate (step 60) and generating output (step 62). The output comprises process flow rate FL in mass or volumetric units, or a combination thereof, with phase-based diagnostic DG.

Depending upon embodiment, sensing differential pressure (step 56) includes restricting the process flow (step 64) and sensing differential pressure DP across the flow restriction. Determining the flow rate (step 60) comprises determining the fluid density (step 66) based on process pressure P and process temperature T.

In volumetric flow embodiments, flow output FL is determined from differential pressure DP as a function of geometrical considerations such as pipe diameter, with indirect dependence on fluid density $\rho$ through Bernoulli's principle. In mass flow embodiments, the volumetric flow rate is sometimes calculated as internal parameter (step 68), which is in turn used to determine the mass flow rate based on fluid density $\rho$. Alternatively, other parameters such as the flow velocity are internally calculated, as based on one or more of process pressure P, differential pressure DP, temperature T and fluid density $\rho$.

Diagnostics DG are generated by comparing process pressure P and process temperature T to phase data (step 70), where the phase data include saturation lines, sublimation curves, melting and freezing curves, vaporization and condensation curves, triple points and critical points for one or more fluid components, as described above. In some embodiments, diagnostics DG are also based on derived quantities such as fluid density $\rho$, or on the flow rate itself, for example to distinguish between sensor error (step 72) and phase transitions or multiphase flow conditions (step 74).

While this invention has been described with reference to exemplary embodiments, it will be understood by those skilled in the art that changes may be made and equivalents may be substituted without departing from the scope of the invention. In addition, modifications may be made to adapt particular situations or materials to the teachings of the invention without departing from the essential scope thereof. The invention is thus not limited to the particular embodiments disclosed herein, but includes all embodiments falling within the scope of the appended claims.

The invention claimed is:

1. A system comprising:
 a differential pressure sensor positioned to sense a differential pressure along a fluid flow, wherein fluid properties of the fluid flow have a first phase and a second phase separated from the first phase along a transition curve;
 a process pressure sensor positioned to sense a process pressure of the fluid flow;
 a temperature sensor positioned to sense a process temperature of the fluid flow;
 a microprocessor coupled to the differential pressure sensor, the process pressure sensor and the temperature sensor in order to determine a flow rate of the fluid flow; and
 a diagnostic module for generating a diagnostic based on the process pressure and the process temperature as compared to the transition curve;
 wherein the diagnostic characterizes the phase of fluid flow, and includes an indication of a potential for a phase transition.

2. The system of claim 1, wherein the diagnostic module generates a diagnostic that indicates a transition between the first phase and the second phase.

3. The system of claim 1, wherein the microprocessor determines a fluid density based on the process pressure and the process temperature, and wherein the microprocessor determines the flow rate based on the differential pressure and the fluid density.

4. The system of claim 1, further comprising a multivariable transmitter for providing the differential pressure sensor, the process pressure sensor, the temperature sensor, the microprocessor and the diagnostic module, such that the multivariable transmitter determines the flow rate and generates the diagnostic.

5. The system of claim 4, further comprising a two-wire interface for providing power and communications to the multivariable transmitter, wherein the multivariable transmitter operates on 500 mW of power or less.

6. The system of claim 1, wherein the diagnostic module generates a diagnostic that indicates a mixture of the first phase and the second phase when the process temperature is proximate the transition curve, as defined at the process pressure, or when the process pressure is proximate the transition curve, as defined at the process temperature.

7. The system of claim 1, wherein the diagnostic module generates a diagnostic that indicates condensation of the second phase when the process temperature is on or below the transition curve, as defined at the process pressure.

8. The system of claim 1, wherein the diagnostic module generates a diagnostic that indicates vaporization of the first phase when the process temperature is on or above the transition curve, as defined at the process pressure.

9. The system of claim 1, wherein the diagnostic module generates a diagnostic that indicates a second-order transition in the fluid flow when the process pressure or the process temperature is at or above a critical point on the transition curve.

10. The system of claim 1, wherein the diagnostic module generates a diagnostic that indicates an error in the temperature sensor when the process temperature is substantially above or substantially below the transition curve, as defined at the process pressure.

11. The system of claim 1, wherein the diagnostic module generates a diagnostic that indicates an error in the process pressure sensor when the process pressure is substantially above or substantially below the transition curve, as defined at the process temperature.

12. A method comprising:
sensing a differential pressure along a fluid flow, wherein fluid properties of the fluid flow have a liquid phase and a vapor phase separated from the liquid phase along a transition curve;
sensing a process pressure of the fluid flow;
sensing a process temperature of the fluid flow;
determining a flow rate of the fluid flow based on the differential pressure, the process pressure and the process temperature;
generating a diagnostic based on the process pressure and the process temperature as compared to the transition curve; wherein generating the diagnostic includes:
characterizing the phase of fluid flow; and
indicating a potential for a phase transition;
generating an output including the flow rate and the diagnostic; and
transmitting the output to a digital control system.

13. The method of claim 12, wherein the diagnostic indicates a transition between the liquid phase and the vapor phase.

14. The method of claim 12, further comprising determining a fluid density based on the process pressure and the process temperature, and wherein the diagnostic indicates an error in the process pressure sensor or the temperature sensor based on the fluid density.

15. The method of claim 12, wherein the diagnostic indicates an error in the temperature sensor when the process temperature is substantially above or substantially below the transition curve, as defined at the process pressure.

16. The method of claim 12, wherein the diagnostic indicates an error in the process pressure sensor when the process pressure is substantially above or substantially below the transition curve, as defined at the process temperature.

17. The method of claim 12, wherein the diagnostic indicates multiphase fluid flow when the process pressure and the process temperature are proximate the transition curve.

18. The method of claim 12, wherein the diagnostic indicates condensation from the vapor phase into the liquid phase when the process temperature is at or below a condensation point on the transition curve, as defined at the process pressure.

19. The method of claim 12, wherein the diagnostic indicates vaporization of the liquid phase when the process temperature is at or above a vaporization point on the transition curve, as defined at the process pressure.

20. The method of claim 12, wherein the diagnostic indicates freezing of the liquid phase when the process temperature is at or below a freezing point on the transition curve, as defined at the process pressure.

21. The method of claim 12, wherein the diagnostic indicates deposition of the vapor phase when the process temperature is at or below a sublimation point on the transition curve, as defined at the process pressure.

22. The method of claim 12, wherein the diagnostic indicates a second-order transition when the process pressure or the process temperature is at or above a critical point on the transition curve.

23. A transmitter comprising:
a differential pressure sensor for sensing differential pressure across a flow restriction in a fluid flow, wherein fluid properties of the fluid flow have a liquid phase and a vapor phase separated from the liquid phase along a saturation line;
a process pressure sensor for sensing a process pressure of the fluid flow;
a temperature sensor for sensing a process temperature of the fluid flow;
a microprocessor for determining a fluid density based on the process pressure and the process temperature, and for determining a flow rate based on the differential pressure and the fluid density; and
a diagnostic module for generating a diagnostic based on the process pressure and the process temperature as compared to the saturation line; wherein the diagnostic is related to the fluid properties of the fluid flow, characterizes the phase of fluid flow, and includes an indication of a potential for a phase transition.

24. The transmitter of claim 23, wherein the diagnostic module generates a diagnostic that indicates a phase transition in the fluid flow.

25. The transmitter of claim 23, wherein the diagnostic module generates a diagnostic that indicates an error in the temperature sensor when the process temperature is substantially above or substantially below the saturation line, as defined at the process pressure.

26. The transmitter of claim 23, wherein the diagnostic module generates a diagnostic that indicates an error in the process pressure sensor when the process pressure is substantially above or substantially below the saturation line, as defined at the process temperature.

27. The transmitter of claim 23, wherein the diagnostic module generates a diagnostic that indicates condensation from the vapor phase to the liquid phase when the process temperature is on or below the saturation line, as defined at the process pressure.

28. The transmitter of claim 23, wherein the diagnostic module generates a diagnostic that indicates multiphase content in the fluid flow when the process pressure is proximate the saturation line, as defined at the process temperature, or when the process temperature is proximate the saturation line, as defined at the process pressure.

* * * * *